(12) United States Patent
Al Majid et al.

(10) Patent No.: US 11,582,176 B2
(45) Date of Patent: *Feb. 14, 2023

(54) CONTEXT SENSITIVE AVATAR CAPTIONS

(71) Applicant: Snap Inc., Santa Monica, CA (US)

(72) Inventors: Newar Husam Al Majid, New York, NY (US); Timothy Jordan Garcia, Toronto (CA); Matthew Colin Grantham, Toronto (CA); Christie Marie Heikkinen, Santa Monica, CA (US); Denise Marcela Martinez, Los Angeles, CA (US); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,309

(22) Filed: Aug. 25, 2021

(65) Prior Publication Data

US 2021/0385180 A1    Dec. 9, 2021

Related U.S. Application Data

(63) Continuation of application No. 16/707,635, filed on Dec. 9, 2019, now Pat. No. 11,128,586.

(51) Int. Cl.
*G06N 3/00*  (2006.01)
*H04L 51/10*  (2022.01)
(Continued)

(52) U.S. Cl.
CPC ............ *H04L 51/10* (2013.01); *G06F 40/169* (2020.01); *G06F 40/295* (2020.01); *G06F 40/30* (2020.01);
(Continued)

(58) Field of Classification Search
CPC ......... H04L 51/10; H04L 51/52; H04L 51/32; H04L 12/1822; H04L 12/1827;
(Continued)

(56) References Cited

U.S. PATENT DOCUMENTS 5,880,731 A    3/1999   Liles et al.
6,023,270 A    2/2000   Brush, II et al.
(Continued)

FOREIGN PATENT DOCUMENTS

CN    109863532 A    6/2019
CN    110168478 A    8/2019
(Continued)

OTHER PUBLICATIONS

"U.S. Appl. No. 16/707,635, Non Final Office Action dated Dec. 10, 2020", 8 pgs.
(Continued)

*Primary Examiner* — Le H Luu
(74) *Attorney, Agent, or Firm* — Schwegman Lundberg & Woessner, P.A.

(57) ABSTRACT

Systems and methods are provided for performing operations including: receiving, by a messaging application, input that selects an option to generate a message using an avatar with a caption; presenting, by the messaging application, the avatar and a caption entry region proximate to the avatar; populating, by the messaging application, the caption entry region with a text string comprising one or more words; determining, by the messaging application, context based on the one or more words in the text string; and modifying, by the messaging application, an expression of the avatar based on the determined context.

20 Claims, 10 Drawing Sheets

(51) Int. Cl.
*G06F 40/30* (2020.01)
*G06T 13/20* (2011.01)
*G06T 13/40* (2011.01)
*H04L 51/52* (2022.01)
*G06F 40/169* (2020.01)
*G06N 3/04* (2006.01)
*G06F 40/295* (2020.01)
*G06N 5/02* (2006.01)

(52) U.S. Cl.
CPC ........... *G06N 3/006* (2013.01); *G06N 3/0454* (2013.01); *G06N 5/022* (2013.01); *G06T 13/20* (2013.01); *G06T 13/40* (2013.01); *H04L 51/52* (2022.05)

(58) Field of Classification Search
CPC ...... G06F 40/30; G06F 40/169; G06F 40/295; G06F 40/56; G06F 16/9535; G06F 3/011; G06F 3/04817; G06F 3/04845; G06N 3/006; G06N 3/0454; G06N 5/022; G06T 13/20; G06T 13/40; G06T 17/20; H04M 1/72544; H04M 1/72555; A63F 13/577; G06K 9/00302; G10L 25/63
See application file for complete search history.

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 11,128,586 B2 | 9/2021 | Al Majid et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0020661 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0169800 A1* | 7/2010 | Lance ............... A63F 13/79 715/757 |
| 2010/0203968 A1 | 8/2010 | Gill et al. |

(56) References Cited

U.S. PATENT DOCUMENTS

| | | |
|---|---|---|
| 2010/0227682 A1 | 9/2010 | Reville et al. |
| 2010/0251094 A1* | 9/2010 | Holm ................. G06F 16/9535 715/230 |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0212501 A1* | 8/2013 | Anderson ............... G06F 3/011 715/764 |
| 2013/0249948 A1 | 9/2013 | Reitan |
| 2013/0257877 A1 | 10/2013 | Davis |
| 2014/0043329 A1 | 2/2014 | Wang et al. |
| 2014/0046661 A1* | 2/2014 | Bruner ............... H04N 21/6582 704/235 |
| 2014/0055554 A1 | 2/2014 | Du et al. |
| 2014/0074943 A1 | 3/2014 | Kanevsky et al. |
| 2014/0125678 A1 | 5/2014 | Wang et al. |
| 2014/0129343 A1 | 5/2014 | Finster et al. |
| 2014/0157153 A1 | 6/2014 | Yuen et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0053186 A1* | 2/2017 | Allen .................... G06V 40/174 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0206797 A1* | 7/2017 | Solomon ................ G06N 3/006 |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2017/0357417 A1* | 12/2017 | Goossens ............... G06Q 10/10 |
| 2018/0047200 A1 | 2/2018 | O'hara et al. |
| 2018/0054466 A1* | 2/2018 | Blattner .................. H04L 51/04 |
| 2018/0077095 A1* | 3/2018 | Deyle .................... G06T 13/205 |
| 2018/0113587 A1 | 4/2018 | Allen et al. |
| 2018/0115503 A1 | 4/2018 | Baldwin et al. |
| 2018/0157901 A1* | 6/2018 | Arbatman ............... H04L 51/10 |
| 2018/0203584 A1* | 7/2018 | Anderson ......... H04M 1/72454 |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2019/0325201 A1 | 10/2019 | Gujral et al. |
| 2020/0074711 A1* | 3/2020 | Barlier ................. G06V 40/171 |
| 2020/0219302 A1* | 7/2020 | Tarquini ................. G06T 13/40 |
| 2021/0176197 A1 | 6/2021 | Al Majid et al. |

FOREIGN PATENT DOCUMENTS

| | | |
|---|---|---|
| CN | 114787813 A | 7/2022 |
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2021119662 A1 | 6/2021 |

OTHER PUBLICATIONS

"U.S. Appl. No. 16/707,635, Notice of Allowance dated May 21, 2021", 5 pgs.

"U.S. Appl. No. 16/707,635, Response filed Mar. 2, 2021 to Non Final Office Action dated Dec. 10, 2020", 10 pgs.

"U.S. Appl. No. 16/707,635, Supplemental Notice of Allowability dated Jun. 1, 2021", 2 pgs.

"International Application Serial No. PCT/US2020/070884, International Search Report dated Mar. 26, 2021", 3 pgs.

"International Application Serial No. PCT/US2020/070884, Written Opinion dated Mar. 26, 2021", 4 pgs.

"International Application Serial No. PCT/US2020/070884, International Preliminary Report on Patentability dated Jun. 23, 2022", 6 pgs.

* cited by examiner

CONTEXT SENSITIVE AVATAR CAPTIONS

CLAIM OF PRIORITY

This application is a continuation of U.S. patent application Ser. No. 16/707,635, filed on Dec. 9, 2019, which is hereby incorporated by reference in its entirety.

TECHNICAL FIELD

The present disclosure relates generally to providing avatars with captions using a messaging application.

BACKGROUND

Users are always seeking new ways to connect with their friends on social media platforms. One way users try to connect with their friends is by sending customized messages with avatars. Many different types of avatars are available for users to choose from to include in the customized messages.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
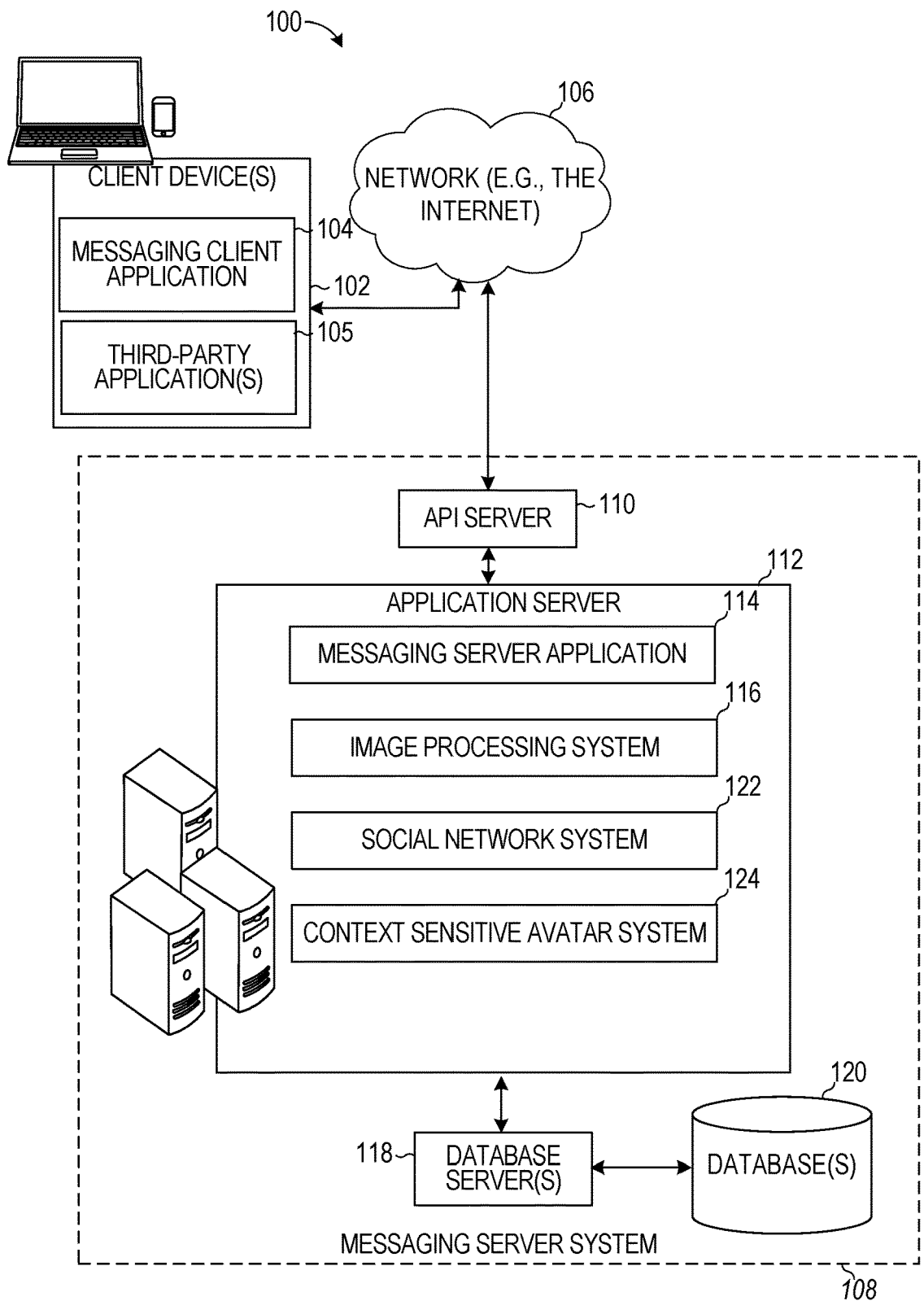
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments.

It will be evident, however, to those skilled in the art, that embodiments may be practiced without these specific details. In general, well-known instruction instances, protocols, structures, and techniques are not necessarily shown in detail.

Typical user devices allow users to communicate with each other using graphics. To do so, a user typically enters search parameters to find graphics that best represents a message the user is trying to convey. Specifically, many graphics may be available for a user to choose from. Finding the right graphics requires navigating through multiple pages of information and can be very tedious and time consuming. Given the complexity and amount of time it takes to find graphics of interest to include in a message being sent, users become discouraged from including graphics in their messages. This results in users losing interest in using advanced features of a messaging application which wastes resources.

The disclosed embodiments improve the efficiency of using the electronic device by providing a messaging application that intelligently and automatically selects an avatar having a particular expression based a message a user composes for transmission to a friend. This results in users spending less time composing messages that include avatars and allows users to more seamlessly create messages that are enriched with content for more accurately conveying a message. Specifically, according to the disclosed embodiments, a messaging application receives a user selection of an option to generate a message using an avatar with a caption. The messaging application presents the avatar and a caption entry region proximate to the avatar and populates the caption entry region with a text string provided by the user. As the user types in one or more words into the text string, the messaging application determines context of the caption and modifies an expression of the avatar based on the determined context.

In some cases, the caption is presented in a curved manner around the avatar. In some cases, the messaging application determines that the text string represents or identifies a second user. In response, the messaging application automatically retrieves a second avatar that represents the second user. The messaging application then presents both the avatar of the user composing the message and the retrieved avatar of the second user identified in the message together. The avatars are presented with expressions that correspond to the context of the message. In some cases, the message application determines that the user is engaged in a conversation with a second user. In response, the messaging application presents an avatar for each user engaged in the conversation with expressions that correspond to context of the conversation or text in the avatar caption.

In this way, the disclosed embodiments improve the efficiency of using the electronic device by reducing the number of screens and interfaces a user has to navigate through to select a suitable avatar to convey a message to other users. This is done by automatically determining context of a message a user is composing, and as the user types in words of the message, modifying the expression of the avatar that is presented and that will be included in the message being sent to other users. This also reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a context sensitive avatar system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. In an embodiment, the third-party application 105 can be accessed by the client device 102 to perform various activities and interactions, such as listening to music, videos, track exercises, view graphical elements (e.g., stickers), communicate with other users, and so forth.

As an example, the third-party application 105 can be a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The messaging client application 104 allows a user to access a camera feature. The camera feature of the messaging client application 104 activates a front-facing camera of the client device 102 and presents video or images captured or received by the front-facing camera on a display screen of the client device 102 as the video or images are being captured. In an implementation, the front-facing camera is integrated or placed on a same side of the client device 102 as the screen that presents the content captured by the front-facing camera.

After the user presses a suitable button of the messaging client application 104 to store the image or video captured by the front-facing camera, the messaging client application 104 allows the user to review or edit the images that were captured. In some cases, one or more editing tools may be presented to modify or edit the stored images. Such editing tools may include text tools allowing the user to add text to the images or videos. Such text tools include a big text option, an avatar with caption option, a rainbow text option, a scripted text option, and so forth.

In response to receiving a user selection of the avatar with caption option, the messaging client application 104 retrieves an avatar of the user. The avatar is presented on top of the image or video that was captured and includes a text entry region. In some cases, the avatar is initially presented with a neutral expression (e.g., not smiling or sad). In some embodiments, the avatar is presented with a default expression which may be selected by the user. The text entry region may be proximate to the avatar, such as above or below the avatar. The text entry region allows the user to input a text string. As the user types in the words of the text string the string wraps around the avatar in a circular manner to surround the avatar.

In some embodiments, the messaging client application 104 processes and analyzes one or more words of the text string input by the user. The messaging client application 104 determines context of the string based on the one or more words of the text string. For example, if the string includes positive or happy words (e.g., glad, excited, ecstatic, impressed, and so forth), the messaging client application 104 determines the context to be positive or happy. In response, the messaging client application 104 retrieves an avatar expression that is associated or that represents a positive or happy mood. The messaging client application 104 modifies the avatar expression immediately once the context is determined to represent the retrieved avatar expression. In this way, as the user types in words of the text string in the caption, the messaging client application 104 dynamically adjusts and modifies the expression of the avatar to represent the mood or context of the message in the text string. For example, if the user inputs additional words after the positive or happy words and after the avatar expression is modified, the avatar expression may change based on the context of the additional words. Namely, the additional words may be determined to be associated with an excited context. In response, the messaging client application 104 modifies the expression of the avatar from representing a positive or happy expression to representing an excited expression.

In some embodiments, the messaging client application 104 may determine that one or more words in the text string represent another user of the messaging application. For example, the one or more words may specifically identify a username of another user or may include attributes that are uniquely associated with the other user. In response, the messaging client application 104 retrieves a second avatar of the other user and presents the second avatar together with a first avatar of the user composing the message. In such cases, the expressions of both avatars may be modified to represent context of the message composed by the user. In some cases, the expression of the first avatar corresponding to the user composing the text string may be modified to represent a first context in the message associated with the user and the expression of the second avatar corresponding to the other user mentioned in the text string may be modified to represent a second context. As an example, the user may type in the string "I am happy but John Smith is sad". In such cases, the expression of the user's avatar may be modified to represent a happy context and the avatar of the other user, John Smith, may be modified to represent a sad context.

In some cases, the messaging client application 104 determines that the user has launched the camera to capture the image or video from within a conversation with one or more other users. In such cases, any image or video and message composed with the image or video may be automatically directed to the one or more other users with whom the user is engaged in a conversation. In such cases, the messaging client application 104 may automatically retrieve avatars of each user involved in the conversation when the user selects the avatar with caption option. The messaging client application 104 may modify the expressions of all the avatars being presented based on the context of the caption or text string input by the user.

After the user completes composing the caption with the avatar, the messaging client application 104 may receive input from the user that selects a send option. In response, the messaging client application 104 sends the image or video that was captured by the user with the avatar with the caption that augments the image or video to one or more designated recipients. The designated recipients may be manually input by the user after composing the message. Alternatively, the designated recipients may be automatically populated to include all members of a conversation when the camera to capture the image or video that includes the avatar with caption was launched from within a conversation with the members of the conversation.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) (e.g., graphical user interfaces) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., graphical elements, images or video) from a messaging client application 104 to a messaging server application 114, and for possible access by another messaging client application 104 or third-party application 105; a graphical element list; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the context sensitive avatar system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the context sensitive avatar system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The context sensitive avatar system 124 dynamically modifies an expression of an avatar based on context of a caption associated with the avatar. For example, the context sensitive avatar system 124 receives a user selection of an avatar with caption option. The context sensitive avatar system 124 presents an avatar of the user and a text entry region. As the user types in words in the text entry region, the context sensitive avatar system 124 determines context of one or more words in the text entry region. In some cases, the context sensitive avatar system 124 determines multiple contexts associated with the one or more words in the text entry region. The context sensitive avatar system 124 ranks the multiple contexts based on relevance and selects a given context associated with a highest rank. The context sensitive avatar system 124 retrieves an avatar expression associated with the given context and modifies the expression of the avatar to represent the retrieved avatar expression. In some cases, the context sensitive avatar system 124 presents multiple avatars with the caption and modifies the expressions of all the avatars based on the context of the caption.

The application server 112 is communicatively coupled to a database server 118, which facilitates access to a database 120, in which is stored data associated with messages processed by the messaging server application 114. Database 120 may be a third-party database. For example, the application server 112 may be associated with a first entity, and the database 120 or a portion of the database 120 may be associated and hosted by a second different entity. In some implementations, database 120 stores user data that the first entity collects about various each of the users of a service provided by the first entity. For example, the user data includes user names, phone numbers, passwords, addresses, friends, activity information, preferences, videos or content consumed by the user, and so forth.

Figure 2:
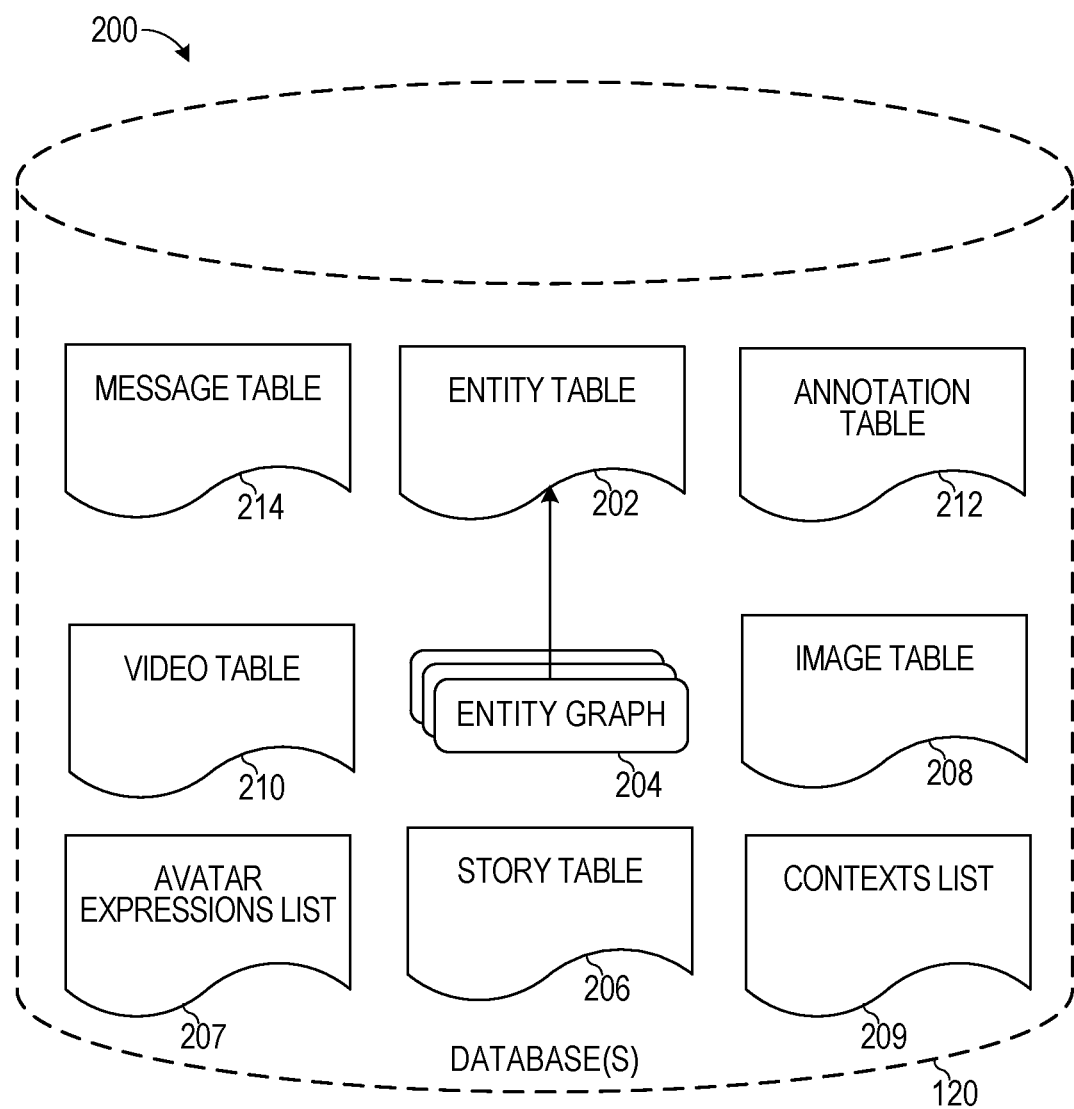
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is augmented reality data or LENSES. Augmented reality data may be a real-time special effect and sound that may be added to an image or a video.

As described above, LENSES, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple LENSES, a user can use a single video clip with multiple LENSES to see how the different LENSES will modify the stored clip. For example, multiple LENSES that apply different pseudorandom movement models can be applied to the same content by selecting different LENSES for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different LENSES will look within different windows in a display at the same time. This can, for example, enable multiple windows with different pseudo-random animations to be viewed on a display at the same time.

Data and various systems to use LENSES or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). LENS data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system. and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Avatar expressions list 207 stores a list of different avatar expressions that are associated with different contexts. For example, the avatar expressions list 207 may store different avatar textures, each associated with a different context. The avatar texture may be retrieved and used to modify an avatar for one or more users to represent the context associated with the avatar texture.

Contexts list 209 stores a list of different contexts associated with different words or combinations of words. Avatar expressions lists 207 stores a list of rules that the context sensitive avatar system 124 uses to process a text string to derive or determine a context of the text string.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
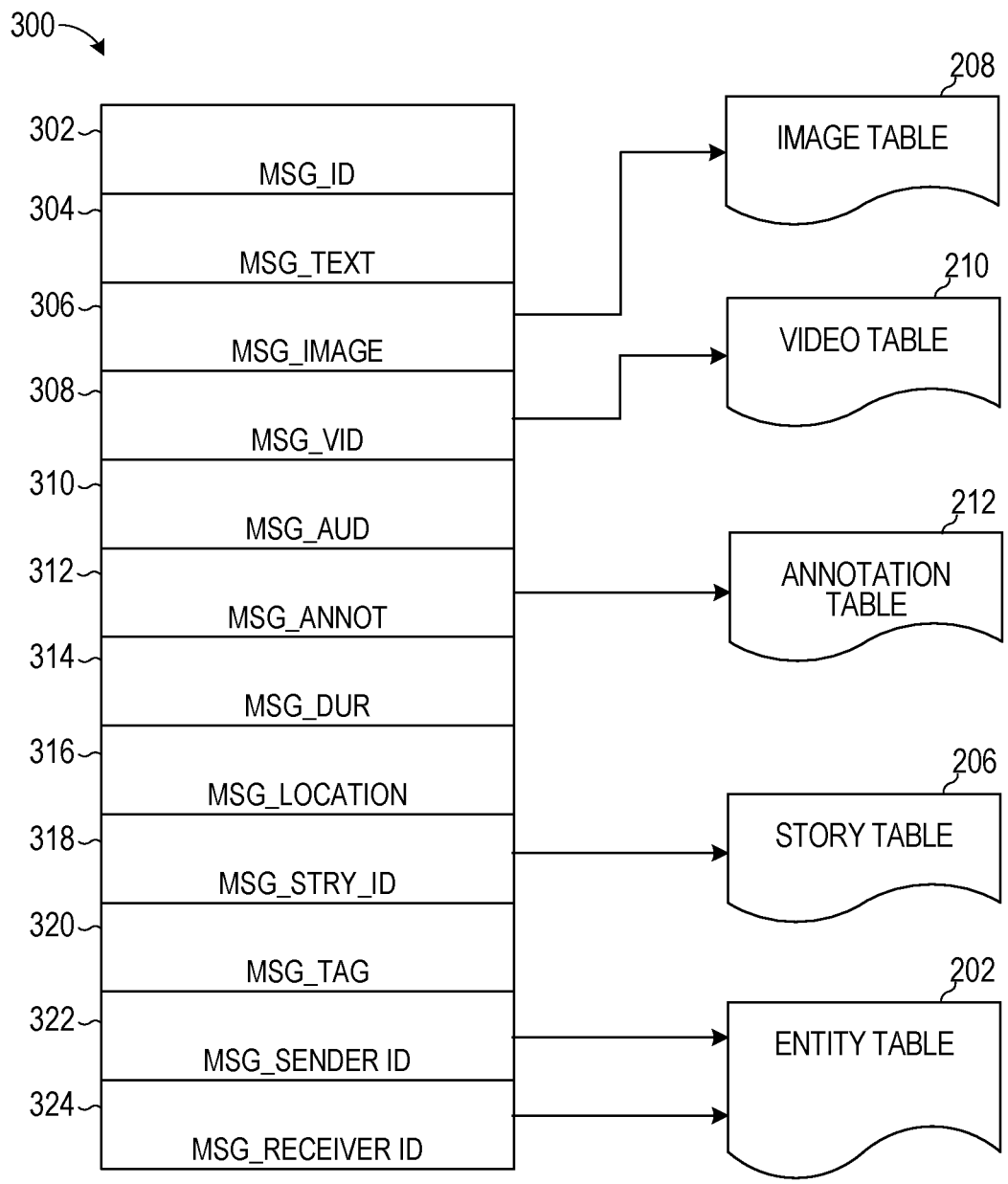
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
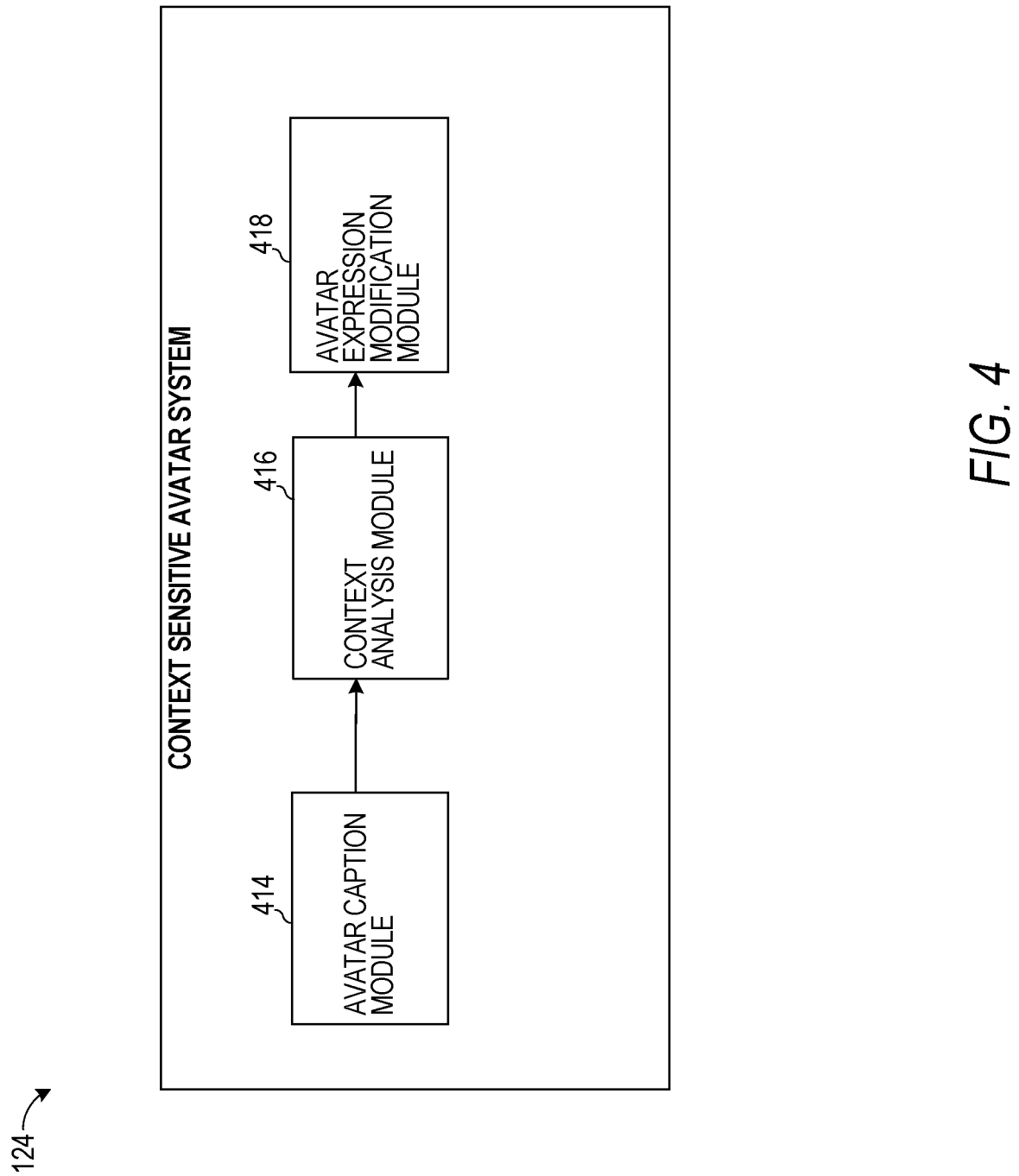
FIG. 4 is a block diagram showing an example context sensitive avatar system, according to example embodiments.

FIG. 4 is a block diagram showing an example context sensitive avatar system 124, according to example embodiments. Context sensitive avatar system 124 includes an avatar caption module 414, a context analysis module 416, and an avatar expression modification module 418.

The user launches an image capture component of the messaging client application 104. In response, the avatar caption module 414 presents on a display screen of the client device 102 an image or video captured by a front-facing or rear-facing camera of the client device 102.

The avatar caption module 414 presents one or more editing tools to the user to modify the image or video is being presented to the user on the screen of the client device 102. The editing tools allow the user to select one or more graphical elements (e.g., avatars, text, emojis, images, videos, and so forth) to add or augment the image or video being presented to the user. For example, the user can add text to the image or video presented on the display screen at a user selected position. In some cases, the editing tools allow the user to select an avatar with caption option.

In response to receiving the user selection of the avatar with caption option, the avatar caption module 414 determines whether the user is engaged in a conversation with one or more other users. Namely, the avatar caption module 414 determines whether the image or video was captured in response to the user selecting a reply with camera option from within a conversation with another user. In response to determining that the reply with camera option was selected from within a conversation to capture the image, the avatar caption module 414 presents avatars for each user with whom the user is engaged in the conversation. The avatars are presented with a caption entry region above or below the avatars. In response to determining that the user is not currently engaged with another member in a conversation (e.g., the reply with camera option was not selected to capture the image), the avatar caption module 414 presents one avatar for the user with the caption entry region above or below the avatar. In both cases (single or multiple avatar presentation), text that is input by the user into the caption entry region wraps around the avatars in a circular manner as the user types in words of a text string for the caption entry region.

Context analysis module 416 processes one or more words in the text string input by the user. The context analysis module 416 analysis the one or more words as the user types in the words with reference to the words and/or rules stored in the contexts list 209. The context analysis module 416 generates a list of contexts for the words the user types in and ranks the generated list of contexts. The context analysis module 416 selects a given context from the generated list that is associated with a highest rank.

In some cases, the context analysis module 416 determines which words in the string are associated with which avatar that is presented. The context analysis module 416 may perform semantic analysis and processing to determine, based on the sentence structure, which words are associated with a particular avatar. For example, if the text string is "I am happy and John Smith is sad," the context analysis module 416 determines that happy is associated with the user who is typing in the expression and that sad is associated with the avatar for John Smith. In such cases, the context analysis module 416 retrieves and selects a context for each avatar that is associated with a particular word. Alternatively, the context analysis module 416 associates all the avatars with the same highest ranked context from the list of contexts.

The avatar expression modification module 418 receives the context or contexts selected by the context analysis module 416. The avatar expression modification module 418 retrieves a texture or textures from the avatar expressions list 207 that is associated with the selected context or contexts. For example, if the selected context is sad, the avatar expression modification module 418 retrieves an avatar texture associated with a sad context. For example, if the selected contexts are sad and happy, the avatar expression modification module 418 retrieves avatar textures associated with sad and happy contexts.

The avatar expression modification module 418 uses the retrieved textures to modify the expression of the avatar or avatars as the user types in the text string in the caption entry region. The avatar expression modification module 418 may receive an indication from the context analysis module 416 that identifies which avatar of multiple avatars that are presented is associated with which context. For example, when the context analysis module 416 determines that a first avatar is associated with words corresponding to a first context and a second avatar is associated with words corresponding to a second context, the context analysis module 416 provides this information to the avatar expression modification module 418. The avatar expression modification module 418 then uses a first texture associated with the first context to modify the expression of the first avatar and uses a second texture associated with the second context to modify the expression of the second avatar.

The context analysis module 416 continuously and dynamically processes words of the caption entry region being input by the user to continuously and dynamically rank and select the most suitable context for the caption. When a different context is selected by the context analysis module 416, the context analysis module 416 notifies the avatar expression modification module 418 to modify the expression of the avatar based on the different or newly selected context. This way, as the user types in words of a string into the caption entry region, the expressions of the avatar or avatars change to represent the context or the string.

Figure 5:
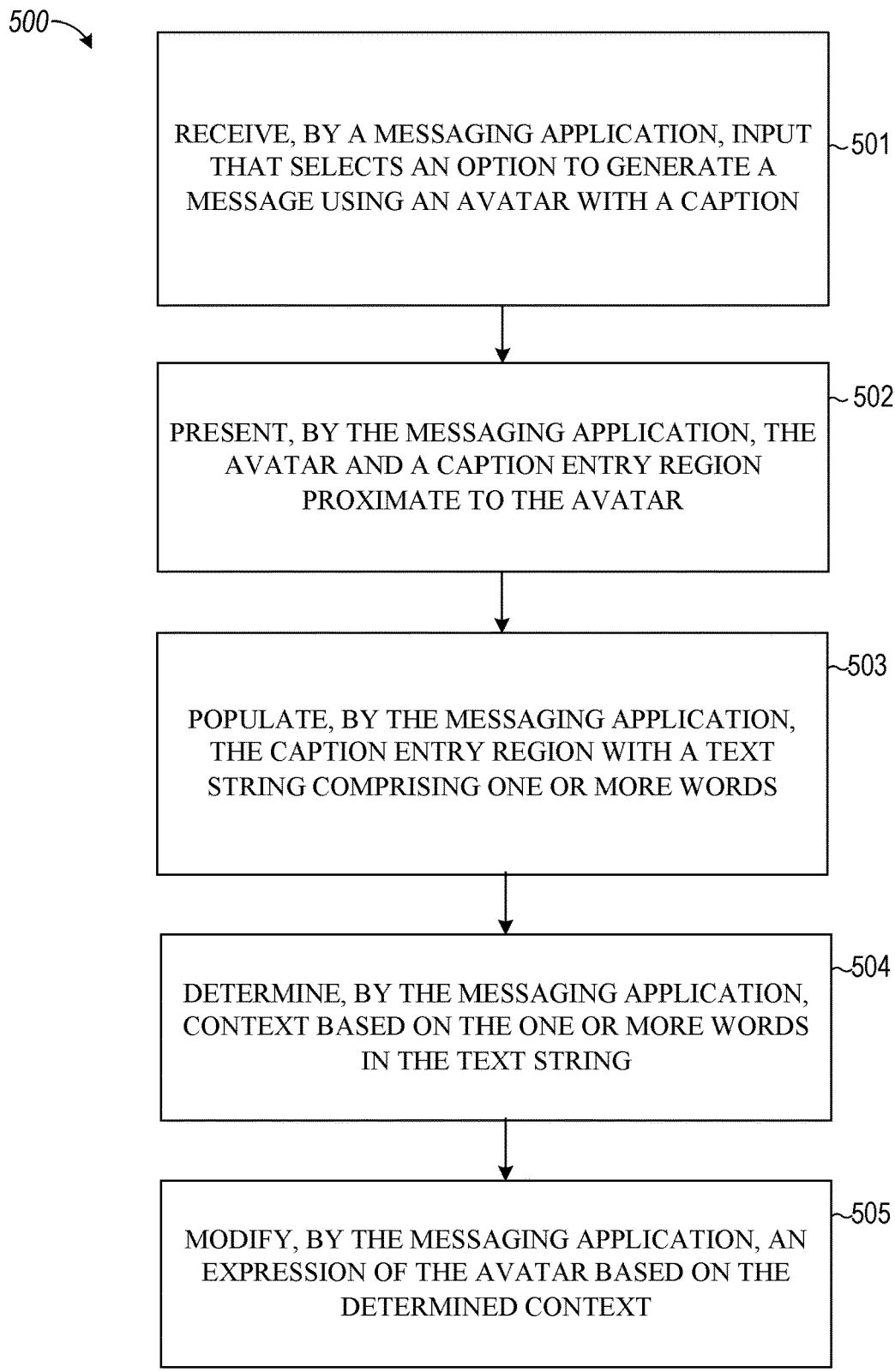
FIG. 5 is a flowchart illustrating example operations of the context sensitive avatar system, according to example embodiments.

FIG. 5 is a flowchart illustrating example operations of the context sensitive avatar system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the context sensitive avatar system 124 receives input that selects an option to generate a message using an avatar with a caption. For example, the context sensitive avatar system 124 determines that a user has captured an image using a camera of a mobile device and has input a request to add text to the image. The context sensitive avatar system 124, in response, presents a menu of text insertion options including an avatar with caption option. The context sensitive avatar system 124 receives a user selection of the avatar with caption option from the menu.

At operation 502, the context sensitive avatar system 124 presents the avatar and a caption entry region proximate to the avatar. For example, the context sensitive avatar system 124 retrieves an avatar associated with the user with a neutral expression. The context sensitive avatar system 124 presents a cursor above or below the avatar that enables the user to input a text string that includes one or more words that surround the avatar in a circular manner.

At operation 503, the context sensitive avatar system 124 populates the caption entry region with a text string comprising one or more words. For example, the context sensitive avatar system 124 receives one or more words from the user typing in characters on a keypad.

At operation 504, the context sensitive avatar system 124 determines context based on the one or more words in the text string. For example, the context sensitive avatar system 124 processes the words, as the words are entered by the user, to determine whether the words are associated with a positive or negative context or a happy or sad context.

At operation 505, the context sensitive avatar system 124 modifies an expression of the avatar based on the determined context. For example, the context sensitive avatar system 124 retrieves a texture for the avatar associated with the determined context and modifies the expression of the avatar using the retrieved texture. Namely, if the context is determined to be sad, the context sensitive avatar system 124 modifies the avatar's expression from neutral to sad.

Figure 6:
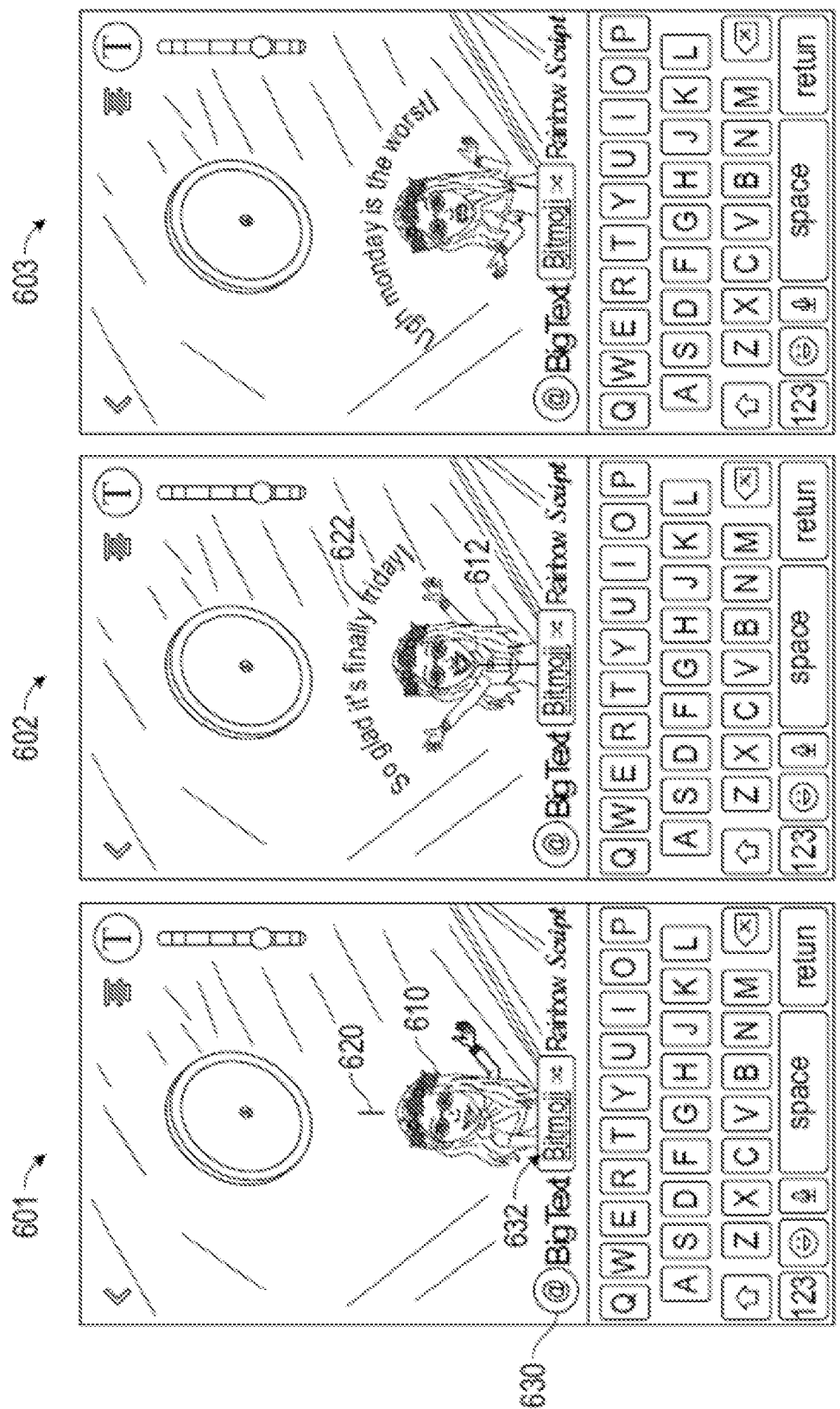
FIGS. 6-8 are illustrative inputs and outputs of the context sensitive avatar system, according to example embodiments.
Figure 7:
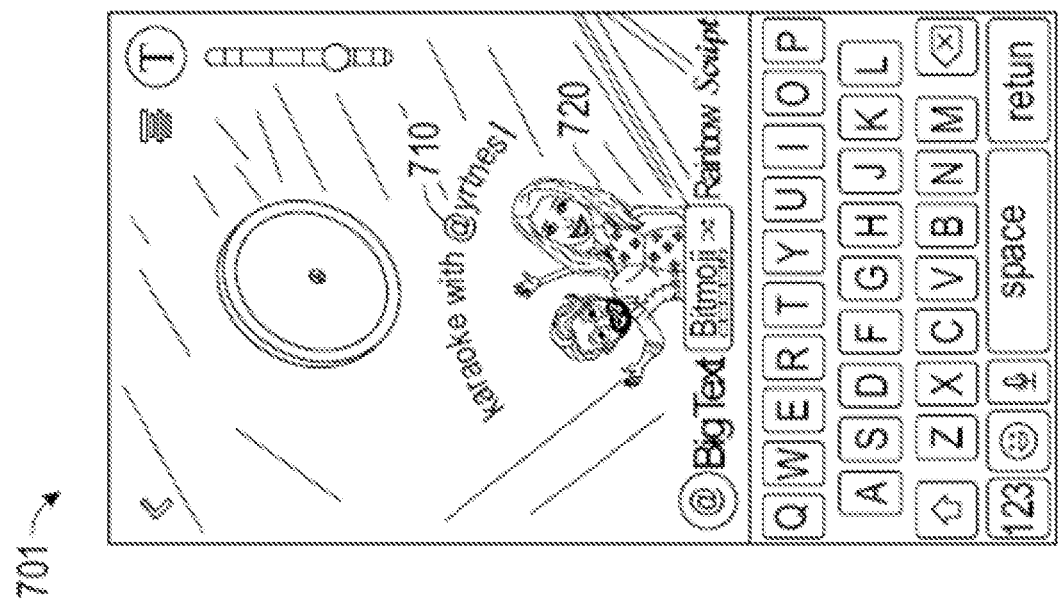
Figure 8:
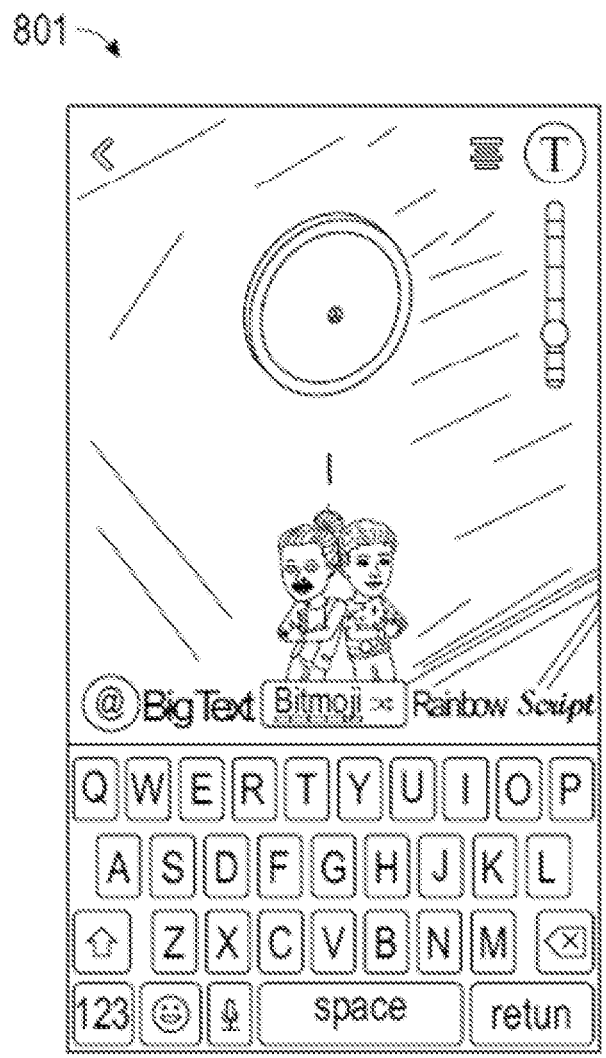

FIGS. 6-8 are illustrative inputs and outputs of the context sensitive avatar system 124, according to example embodiments. For example, as shown in FIG. 6, after the user captures an image with a camera of the user device, the user selects an option to add text to the image. In response, the context sensitive avatar system 124 presents a text options menu 630 with a plurality of text entry types. For example, a first text entry type is an "@" type which allows a user to add text with a reference to another user or a subject. A second text entry type is a big text entry type which allows a user to input text and add text to the image with very large font or style. A third text entry type is an avatar with caption option 632 that allows the user to add an avatar and input a text in caption entry region proximate to the avatar. A fourth text entry type is a rainbow text entry type which allows the user to input text with colorful attributes. A fifth text entry type is a script type with allows the user to input text with a script attribute.

As shown in screen 601, the user selects the avatar with caption option 632. In response, the context sensitive avatar system 124 retrieves an avatar 610 associated with the user and presents the avatar 610 together with a caption entry region 620. The context sensitive avatar system 124 allows the user to type in text and, as shown in screen 602, the string 622 input by the user wraps around in a circular manner around the avatar 612. Also, the context sensitive avatar system 124 determines that the context in the string input by the user is happy. For example, the context sensitive avatar system 124 determines that the word "glad" is in the string 622 and that the word has a happy context. In response, the context sensitive avatar system 124 modifies the expression of the avatar 610 to have a happy expression as shown by avatar 612. Namely, avatar 610 in screen 601 may have a neutral expression and avatar 612 may have a happy expression to represent the context of the string 622 input by the user.

Screen 603 shows another example in which the string input by the user is determined to have a sad context. For example, the string may include the word "worst" which is determined by the context sensitive avatar system 124 to have a sad context. In response, the expression of avatar 610 is modified to have a sad expression as shown in screen 603. The user can select a send option to designate recipients of a message that includes the image captured by the user augmented with the avatar with the caption having the modified expression.

As shown in FIG. 7, the user types in a string that includes a symbol 710 (e.g., "@") that references a subject or user. Screen 701 includes a string with the symbol 710 that references a username of another user. In response, the context sensitive avatar system 124 retrieves a second avatar associated with the referenced username of the other user. The context sensitive avatar system 124 presents both avatars 720 (one for the user composing the string and another for the second user). The avatars 720 are surrounded by the string with the symbol 710 that wraps around the avatars 720 in a circular manner. The avatars 720 are modified to have an expression that corresponds to the context of the string input by the user. The user can select a send option to designate recipients of a message that includes the image captured by the user augmented with the avatars 720 with the caption that includes the symbol 710.

In some embodiments, the user selects a reply with camera option from within a conversation with another user. In response to the user selecting the reply with camera option, the messaging client application 104 activates the camera and allows the user to capture an image or video. After the user captures the image or video, the user can augment the image or video with text by selecting a text entry option from a text tools menu. In response to the user selecting the avatar with caption option, the context sensitive avatar system 124 determines that the user captured the image when the user selected the reply with camera option and that the user is engaged in a conversation with one or more other users. In such cases, the context sensitive avatar system 124 retrieves avatars for each user with whom the user is engaged in the conversation and presents all the avatars on the screen 801 together with the caption entry region. The user can enter a string into the caption entry region and the string wraps around the avatars in a circular manner. The expressions of one or more of the avatars are modified based on context of the string input by the user. In some cases, the context sensitive avatar system 124 modifies the expressions of the avatars by analyzing one or more words in the conversation (e.g., words previously exchanged between the users) and/or by analyzing one or more words in the string being input by the user for the cation (e.g., words not previously exchanged between the users).

In some embodiments, the initial expressions of the avatars that are presented when the user selects the avatar with caption option may be determined based on one or more words in a last message exchanged between the users. The initial expressions of the avatars are then modified based on the one or more words of the string input by the user in the caption entry region. For example, the user may be engaged in a conversation with another user, John. The last message sent or received by the user to/from John, may be "I am happy today". The context sensitive avatar system 124 may determine that the context of this message is happy. In response to receiving a user selection of the avatar with caption option (after selecting a reply with camera option and capturing an image), the context sensitive avatar system 124 may present avatars for the user and for John with happy expressions. The user may then input the string "today is not a good day" into the caption entry region. The context sensitive avatar system 124 may determine that the string is associated with a sad context and, in response, may modify the expressions of the avatars for the user and for John from being happy to be sad. The user can then select a send option to send a message to all the users involved in the conversation. The message includes the image captured by the user, the avatars with the modified expressions, and the caption with the string input by the user wrapping around in a circular manner around the avatars. The recipients of the message are automatically selected based on the identities of the members of the conversation.

Figure 9:
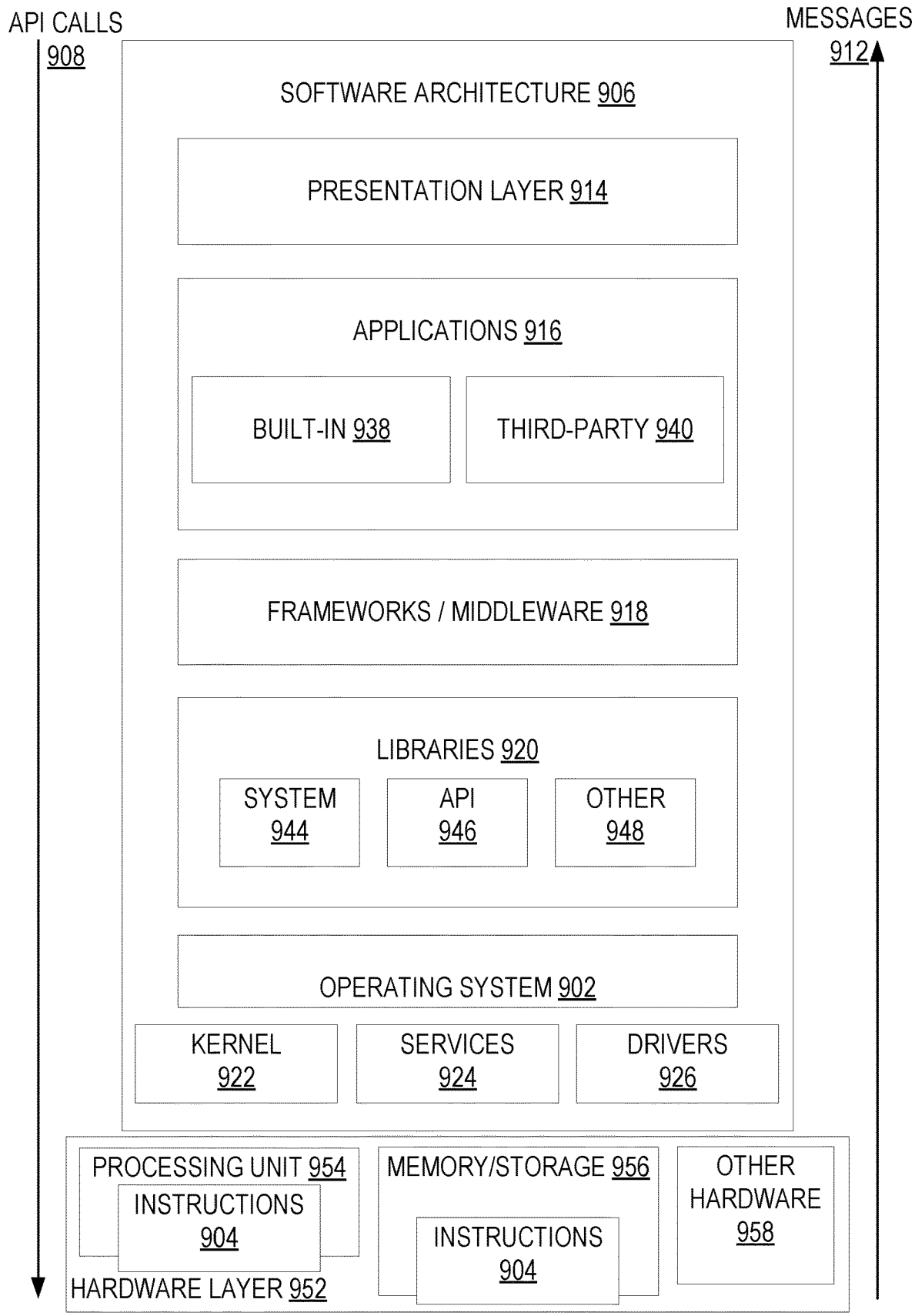
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
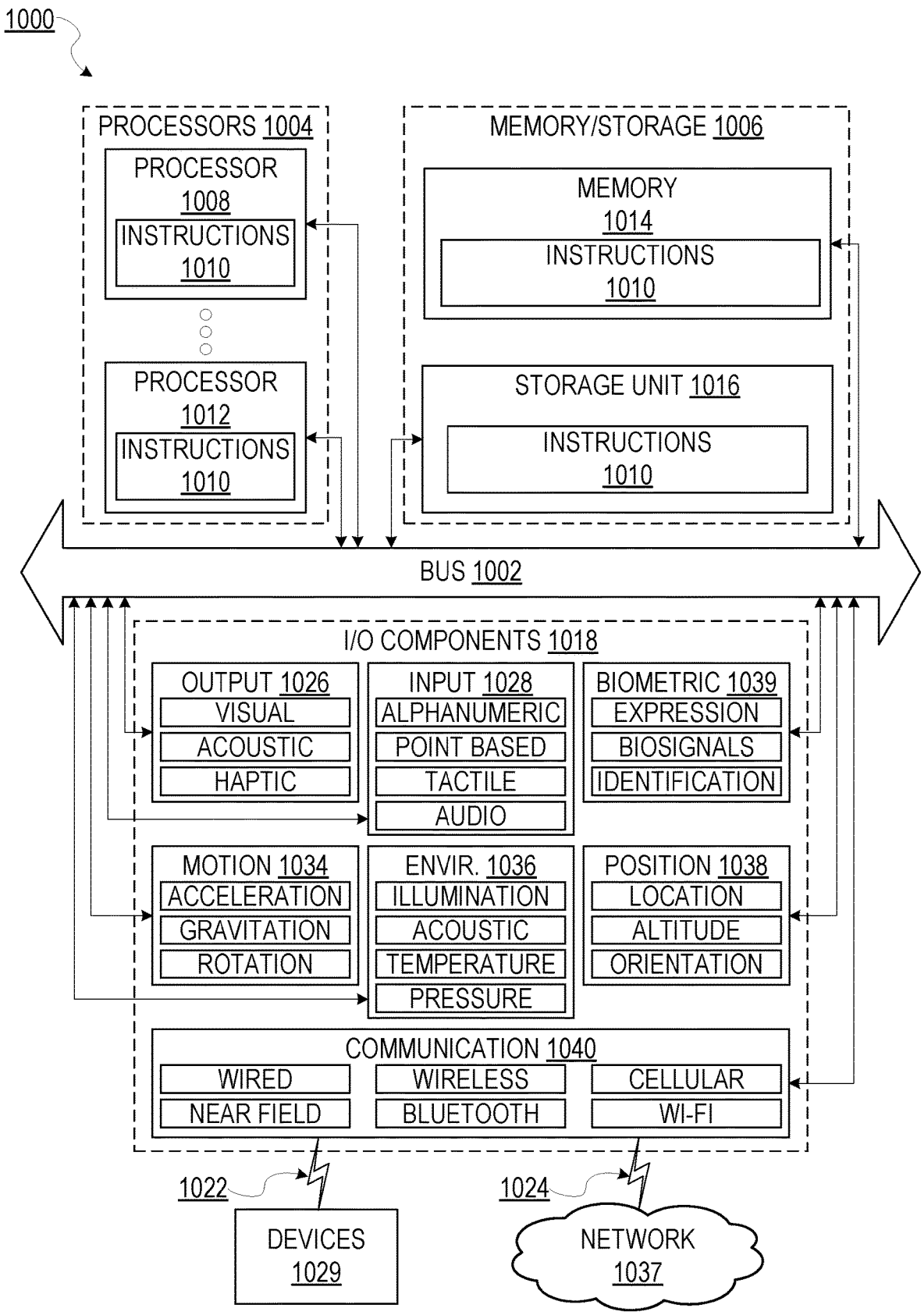
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   presenting, by a messaging application, a first avatar and a caption entry region proximate to the first avatar, the avatar being associated with a first user;
   populating, by the messaging application, the caption entry region with a text string comprising one or more words received as input by a first user device of the first user;
   adding a second avatar associated with a second user for display together with the first avatar; and
   modifying display of the caption entry region to curve around the first and second avatars as the one or more words in the text string are received as input by the first user device.

2. The method of claim 1, further comprising:
   receiving input that selects an option to generate a message using an avatar with a caption; and
   determining, by the messaging application, context based on the one or more words in the text string by detecting a symbol in the text string that indicates a reference to the second user of the messaging application.

3. The method of claim 2, further comprising:
   modifying, by the messaging application, an expression of the first avatar based on the determined context.

4. The method of claim 2, further comprising:
   receiving input comprising a first word of the one or more words;
   determining that the first word corresponds to a first context; and
   causing the first avatar to be presented with a first expression that corresponds to the first context.

5. The method of claim 4, further comprising:
   after receiving input comprising the first word, receiving input comprising a second word of the one or more words;
   determining that the second word corresponds to a second context that is different from the first context; and
   changing the expression of the first avatar from the first expression to a second expression that corresponds to the second context.

6. The method of claim 1, further comprising:
   storing a database that associates different contexts with respective expressions; and
   retrieving from the database an expression associated with a determined context.

7. The method of claim 1, further comprising:
   receiving a request to access a caption tool; and
   in response to the request, presenting a menu comprising a plurality of textual entry types, wherein one of the plurality of textual entry types comprises the avatar with a caption textual entry type.

8. The method of claim 1, further comprising transmitting a message to a computing device of the second user, the message comprising the first and the second avatars and an image or video captured by the first user device.

9. The method of claim 1, further comprising:
   determining that the first user is currently engaged in a conversation with a third user when the input is received;
   in response determining that the first user is currently engaged in a conversation with the third user, retrieving a third avatar associated with the third user;
   presenting the first avatar associated with the first user and the third avatar associated with the third user; and
   presenting the caption entry region proximate to the first and third avatars.

10. The method of claim 1, further comprising:
    presenting a conversation interface comprising a plurality of messages exchanged between the first and second users;
    receiving input that selects a camera option from within the conversation interface;
    enabling the first user to capture an image using a camera in response to receiving the input that selects the camera option; and
    receiving input that selects an option to generate the message after the image is captured.

11. The method of claim 1, further comprising:
    determining context of a conversation by processing one or more words in the conversation; and
    modifying expressions of the first and second avatars based on the one or more words in the conversation.

12. The method of claim 1, further comprising:
    determining a first context that is associated with the first user based with a word of the one or more words in the text string;
    determining a second context that is associated with the second user based with a different word of the one or more words in the text string; and
    presenting the first avatar with a first expression corresponding to the first context together with the second avatar with a second expression corresponding to the second context.

13. The method of claim 12, further comprising:
    identifying a plurality of contexts based on the one or more words in the text string;
    ranking the plurality of contexts based on relevance; and
    selecting, as the determined first context, the context in the plurality of contexts associated with a highest rank.

14. The method of claim 1, further comprising:
    launching an image capture component of the messaging application in response to receiving a user selection of a reply with camera option in a conversation, wherein the avatar and the caption entry region are presented in response to launching the image capture component.

15. The method of claim 1, further comprising sending the first and second avatars to one or more designated recipient computing devices.

16. A system comprising:
    a processor configured to perform operations comprising:
    presenting, by a messaging application, a first avatar and a caption entry region proximate to the first avatar, the avatar being associated with a first user;
    populating, by the messaging application, the caption entry region with a text string comprising one or more words received as input by a first user device of the first user;
    adding a second avatar associated with a second user for display together with the first avatar; and modifying display of the caption entry region to curve around the first and second avatars as the one or more words in the text string are received as input by the first user device.

17. The system of claim 16, wherein the operations further comprise:

receiving input that selects an option to generate a message using an avatar with a caption; and determining, by the messaging application, context based on the one or more words in the text string by detecting a symbol in the text string that indicates a reference to the second user of the messaging application.

18. The system of claim 17, wherein the operations further comprise:

modifying, by the messaging application, an expression of the first avatar based on the determined context.

19. A non-transitory machine-readable storage medium that includes instructions that, when executed by one or more processors of a machine, cause the machine to perform operations comprising:

presenting, by a messaging application, a first avatar and a caption entry region proximate to the first avatar, the avatar being associated with a first user;

populating, by the messaging application, the caption entry region with a text string comprising one or more words received as input by a first user device of the first user;

adding a second avatar associated with a second user for display together with the first avatar; and modifying display of the caption entry region to curve around the first and second avatars as the one or more words in the text string are received as input by the first user device.

20. The non-transitory machine-readable storage medium of claim 19, wherein the operations further comprise:

receiving input that selects an option to generate a message using an avatar with a caption; and determining, by the messaging application, context based on the one or more words in the text string by detecting a symbol in the text string that indicates a reference to the second user of the messaging application.

* * * * *

UNITED STATES PATENT AND TRADEMARK OFFICE
CERTIFICATE OF CORRECTION

PATENT NO. : 11,582,176 B2
APPLICATION NO. : 17/411309
DATED : February 14, 2023
INVENTOR(S) : Al Majid et al.

It is certified that error appears in the above-identified patent and that said Letters Patent is hereby corrected as shown below:

On the Title Page

On page 2, in Column 2, under item (56), "U.S. Patent Documents", Line 56, delete "2005/0020661" and insert --2005/0206610-- therefor Signed and Sealed this
Twenty-seventh Day of February, 2024

Katherine Kelly Vidal
*Director of the United States Patent and Trademark Office*